(12) United States Patent
Lui et al.

(10) Patent No.: US 6,928,215 B1
(45) Date of Patent: Aug. 9, 2005

(54) OPTICAL TAP FOR OPTICAL INTEGRATED CIRCUITS

(75) Inventors: Wayne Wai Wing Lui, Fremont, CA (US); Alice Liu, San Jose, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 0 days.

(21) Appl. No.: 09/915,155

(22) Filed: Jul. 25, 2001

(51) Int. Cl.[7] ................................................. G02B 6/26
(52) U.S. Cl. ............................ 385/39; 385/42; 385/50
(58) Field of Search ............................. 385/14, 15, 27, 385/31, 39, 42, 50, 51

(56) References Cited

U.S. PATENT DOCUMENTS

| | | | | |
|---|---|---|---|---|
| 4,026,632 A | * | 5/1977 | Hill et al. ...................... | 385/28 |
| 4,483,583 A | * | 11/1984 | Unger ........................... | 385/42 |
| 4,720,160 A | * | 1/1988 | Hicks, Jr. ...................... | 385/31 |
| 4,759,596 A | * | 7/1988 | Po et al. ........................ | 385/37 |
| 4,772,084 A | * | 9/1988 | Bogert .......................... | 385/40 |
| 4,852,117 A | * | 7/1989 | Po ................................. | 372/97 |
| 5,539,850 A | | 7/1996 | Henry et al. .................. | 385/48 |
| 5,664,037 A | * | 9/1997 | Weidman ...................... | 385/46 |
| 5,719,976 A | | 2/1998 | Henry et al. .................. | 385/50 |
| 5,845,025 A | * | 12/1998 | Garito et al. ................. | 385/50 |
| 5,915,051 A | * | 6/1999 | Damask et al. ............... | 385/16 |
| 6,130,969 A | * | 10/2000 | Vileneuve et al. ............ | 385/27 |

OTHER PUBLICATIONS

Li, Y.P., et al., "Silica–based optical integrated circuits," IEE Proc.–Optoelectron, vol. 143, No. 5, Oct. 1996, pp. 263–280.

* cited by examiner

Primary Examiner—Brian Healy
Assistant Examiner—Kevin S Wood
(74) Attorney, Agent, or Firm—Amin & Turocy, LLP

(57) ABSTRACT

Optical circuits are disclosed having a source waveguide, a first tap waveguide and a second tap waveguide. Optical power is transferred via evanescent coupling from the source waveguide to the first tap waveguide and from the first tap waveguide to the second tap waveguide such that power loss is minimized. Also disclosed are methods for fabricating optical integrated circuits.

24 Claims, 7 Drawing Sheets

DISTANCE ALONG SECOND TAP
WAVEGUIDE

US 6,928,215 B1

OPTICAL TAP FOR OPTICAL INTEGRATED CIRCUITS

TECHNICAL FIELD

The present invention relates to the art of optical integrated circuits and more particularly to apparatus and methods for an optical tap in optical integrated circuits.

BACKGROUND OF THE INVENTION

Optical integrated circuits (OICs) come in many forms such as 1×N optical splitters, optical switches, wavelength division multiplexers (WDMs), demultiplexers, optical add/drop multiplexers (OADMs), and the like. Such OICs are employed in constructing optical networks in which light signals are transmitted between optical devices for carrying data and other information. For instance, traditional signal exchanges within telecommunications networks and data communications networks using transmission of electrical signals via electrically conductive lines are being replaced with optical fibers and circuits through which optical signals are transmitted. Such optical signals may carry data or other information through modulation techniques, for transmission of such information through an optical network. Optical circuits allow branching, coupling, switching, separating, multiplexing and demultiplexing of optical signals without intermediate transformation between optical and electrical media.

Such optical circuits include planar lightwave circuits (PLCs) having optical waveguides on flat substrates, which can be used for routing optical signals from one of a number of input optical fibers to any one of a number of output optical fibers or optical circuitry. PLCs make it possible to achieve higher densities, greater production volume and more diverse functions than are available with fiber components through employment of manufacturing techniques typically associated with the semiconductor industry. For instance, PLCs contain optical paths known as waveguides formed on a silicon wafer substrate using lithographic processing, wherein the waveguides are made from transmissive media including undoped silica, doped silica and glass, which have a higher index of refraction than the chip substrate or the outlying cladding layers in order to guide light along the optical path. By using advanced photolithographic and other processes, PLCs are fashioned to integrate multiple components and functionalities into a single optical chip.

Optical tap(s) are employed, for example, to monitor signal(s) carried in a waveguide. As illustrated in FIG. 1, a conventional optical tap OIC 100 includes a base 104, such as a an undoped silica film, with a source input port 102, a source output port 106 and a tap output port 124. A multiple wavelength light input signal is received at the source input port 102 (e.g., from an optical fiber in a network, not shown) and transmitted across the OIC via a source waveguide 110. A tap waveguide 122 is parallel to the source waveguide 110 for a length L in a coupling region 120. Thereafter, the tap waveguide 122 is offset and/or tapers away from the source waveguide 110. Through optical coupling in the coupling region 120, the tap waveguide 122 carries an output signal to the tap output port 124 that is based on the input signal. However, power is undesirably wasted (e.g., up to 2 to 3 percent) in the tapping process.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The present invention provides optical circuit apparatus and methods for an optical tap mitigating and/or overcoming the shortcomings associated with conventional optical tap(s) used in optical circuit(s) and other devices.

In one aspect of the invention, an optical integrated circuit is provided having a source waveguide carrying an input signal, a first tap waveguide and a second tap waveguide. The first tap waveguide is spaced a first distance from the source waveguide and the second tap waveguide is spaced a second distance from the first tap waveguide in a coupling region for a length $L_1$. Thereafter, the second tap waveguide tapers away from the source waveguide. In the coupling region, the first tap waveguide is optically coupled to the source waveguide and the second waveguide is optically coupled to the first tap waveguide. Through optical coupling, a portion of the input signal of the source waveguide is transferred to the first tap waveguide a portion which is then transferred to the second tap waveguide. The second tap waveguide thus carries an output signal based, at least in part, upon the input signal.

Another aspect of the present invention provides for the second tap waveguide to have an additional length $L_3$ preceding the length L followed by an additional length $L_4$ before tapering away from the source waveguide. The additional lengths $L_3$ and $L_4$ of the second tap waveguide facilitate transfer of optical power with minimal power loss. Additionally, the transfer of the input signal to the second tap waveguide can be minimally dependent on polarization of the input signal. Further, the source waveguide, the first tap waveguide and the second tap waveguide can be the same or of differing widths.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
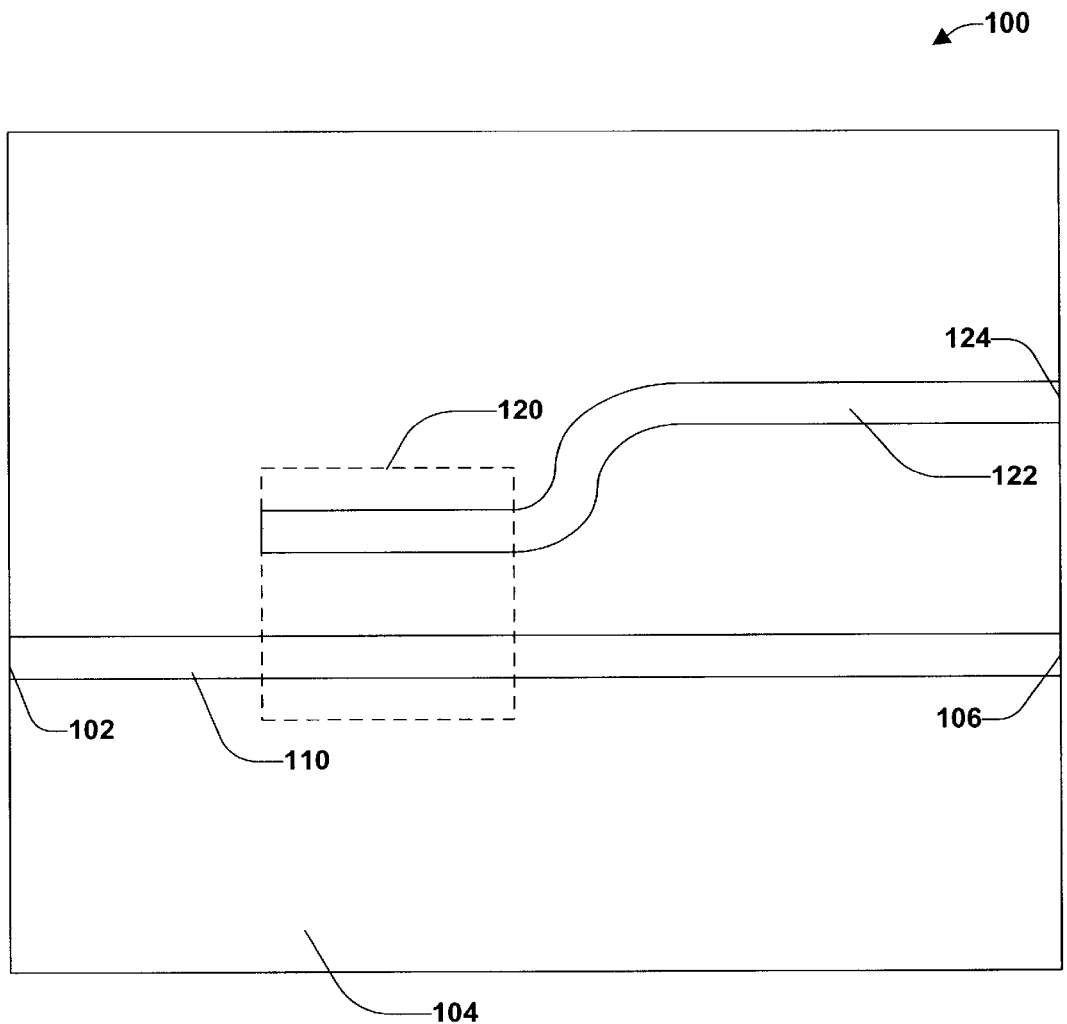
FIG. 1 is a schematic top plan view of a conventional optical tap device.

The various aspects of the present invention will now be described with reference to the drawings, wherein like reference numerals are used to refer to like elements throughout. The invention provides for mitigation of power loss in optical tap(s) employed with optical integrated circuits. In one embodiment, the optical tap of the present invention has a power loss of about 0.5% or less. In another embodiment, the optical tap of the present invention has a power loss of about 0.1% or less.

Figure 2:
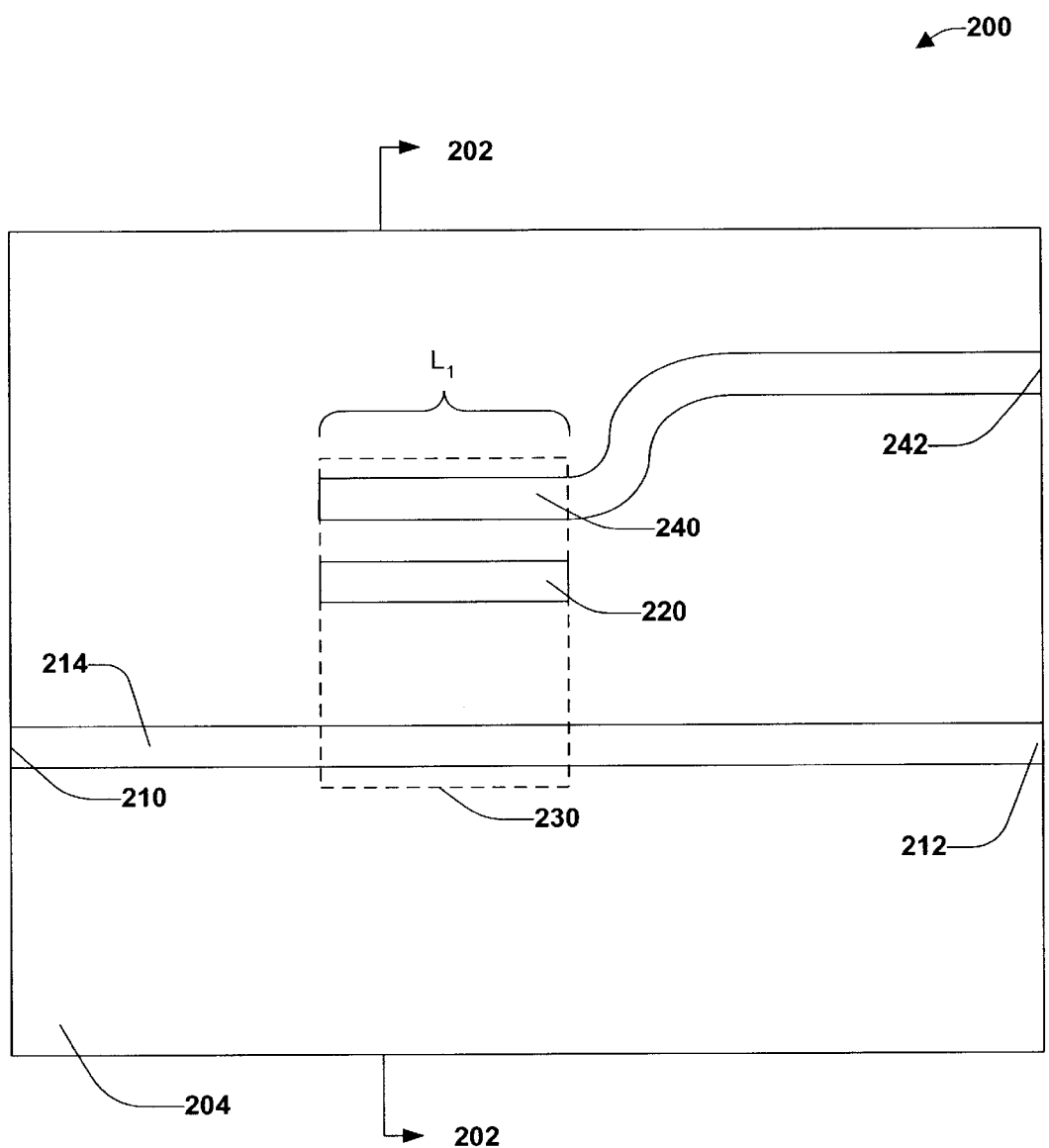
FIG. 2 is a schematic top plan view of an exemplary optical tap optical integrated circuit having two tap waveguides in accordance with an aspect of the present invention.
Figure 3:
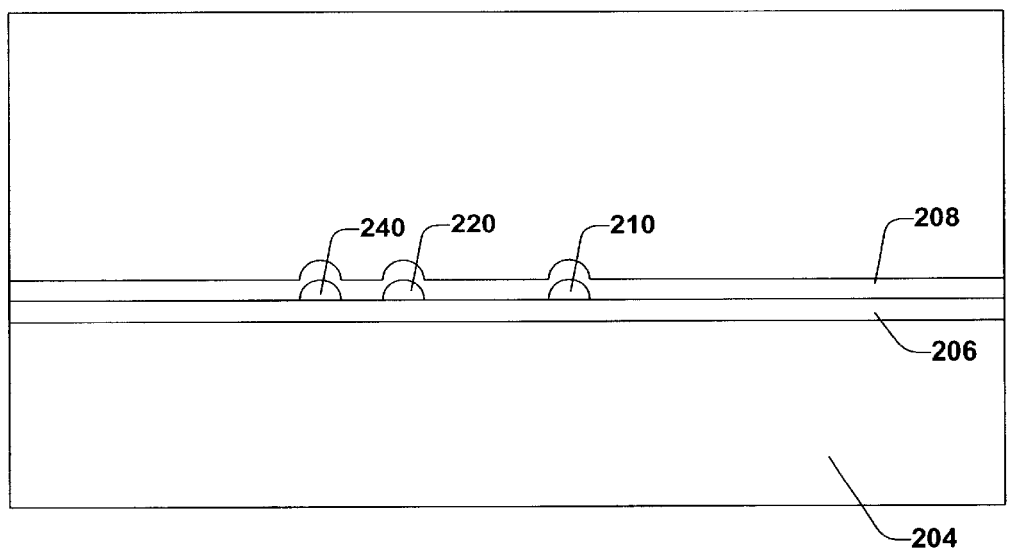
FIG. 3 is a schematic cross section view of the optical tap optical integrated circuit of FIG. 2.

One exemplary implementation of the invention is illustrated in FIGS. 1–3, in which an optical tap OIC 200 includes a base 204, such as a silica film deposited on a silicon substrate, with a source input port 210, a source output port 212 and a tap output port 242. The optical tap integrated circuit further includes a source waveguide 214, a first tap waveguide 220 spaced a first distance from the source waveguide 214, a second tap waveguide 240 spaced a second distance from the first tap waveguide 220 in a coupling region 230 having a coupling length $L_1$. The source waveguide 214, the first tap waveguide 220 and the second tap waveguide 240 can be made from transmissive media having a higher index of refraction than the chip substrate or the outlying cladding layers in order to guide light along the optical path (e.g., lithium niobate ($LiNbO_3$) or other inorganic crystals, undoped silica, doped silica, glass, thermo optic polymers, electro optic polymers and semiconductors such as indium phosphide (InP)).

The first distance is suitable to facilitate coupling between the source waveguide 214 and the first tap waveguide 220. In one embodiment, the first distance is about 0.25 microns or more and about 20 microns or less. In another embodiment, the first distance is about 1 micron or more and about 15 microns or less. In yet another embodiment, the first distance is about 2 microns or more and about 10 microns or less.

The second distance is suitable to facilitate coupling between the first tap waveguide 220 and the second tap waveguide 240. In one embodiment, the second distance is about 0.25 microns or more and about 20 microns or less. In a second embodiment, the second distance is about 1 micron or more and about 15 microns or less. In yet a third embodiment, the second distance is about 2 microns or more and about 10 microns or less.

The first tap waveguide 220 is positioned between the source waveguide 214 and the second tap waveguide 240. In one embodiment, the first distance is greater than the second distance. In another embodiment, the first distance is less than the second distance. In yet a third embodiment, the first distance is substantially equal to the second distance. The first tap waveguide 220 and the second tap waveguide 240 are substantially parallel to the source waveguide in the coupling region 230.

Multiple wavelength light is received at the source input port 210 (e.g., from an optical fiber in a network, not shown) and transported via the source waveguide 214 in the substrate base 204 to the source output port 212. As the multiple wavelength light is transported via the source waveguide 214, its enters a coupling region 230. In the coupling region 230, optical power is transferred via coupling and particularly evanescent coupling from the source waveguide 214 to the first tap waveguide 220 and from the first tap waveguide 220 to the second tap waveguide 240. Due in part, to evanescent coupling, a portion of the input signal is transferred to the first tap waveguide 220 a portion of which is then transferred to the second tap waveguide 240.

Utilizing coupled-mode theory, it is possible to theoretically determine the length $L_1$ of the first tap waveguide 220 such that the coupling loss is a minimum. For example, for a light wave propagating along the z-axis of a source waveguide 214 (with optical power a1) having propagation constant B coupling to a first tap waveguide 220 (with optical power a2) and a second tap waveguide 240 (with optical power a3), assuming the first distance (between the source waveguide 214 and the first tap waveguide 220) is greater than the second distance (between the first tap waveguide 220 and the second waveguide 240), the coupled mode equations with respect to z (which is a measure of propagation distance lengthwise along the waveguides in the coupling region 230) describing power transfer between the source waveguide 214, the first tap waveguide 220 and the second tap waveguide 240 are:

$$jda_1/dz = \kappa_{12}a_1 + \kappa_{13}a_1 + \gamma_{12}a_2 + \gamma_{13}a_3 \quad (1)$$

$$jda_2/dz = \kappa_{21}a_2 + \kappa_{23}a_2 + \gamma_{21}a_1 + \gamma_{23}a_3 \quad (2)$$

$$jda_3/dz = \kappa_{31}a_3 + \kappa_{32}a_3 + \gamma_{32}a_2 + \gamma_{31}a_1 \quad (3)$$

Letting $\kappa_{ij} = \kappa_{ji}$ and $\gamma_{ij} = \gamma_{ji}$, in matrix form, the coupled mode equations become:

$$jd/dz \begin{bmatrix} a1 \\ a2 \\ a3 \end{bmatrix} = \begin{bmatrix} \kappa_{12}+\kappa_{13} & \gamma_{12} & \gamma_{13} \\ \gamma_{12} & \kappa_{12}+\kappa_{23} & \gamma_{23} \\ \gamma_{13} & \gamma_{23} & \kappa_{13}+\kappa_{23} \end{bmatrix} \begin{bmatrix} a1 \\ a2 \\ a3 \end{bmatrix} \quad (4)$$

In this case, if it is assumed that the first tap waveguide and the second tap waveguide are placed closer than the source waveguide and the first tap waveguide, it can be assumed that $\gamma_{12} \ll \gamma_{23}$. Moreover, in general, $\kappa \gg \gamma$. With these assumptions, equation (4) above, becomes:

$$jd/dz \begin{bmatrix} a1 \\ a2 \\ a3 \end{bmatrix} = \begin{bmatrix} \kappa_{12} & 0 & 0 \\ 0 & \kappa_{12}+\kappa_{23} & \gamma_{23} \\ 0 & \gamma_{23} & \kappa_{23} \end{bmatrix} \begin{bmatrix} a1 \\ a2 \\ a3 \end{bmatrix} \quad (5)$$

Letting $\beta$ be the eigenvalue of equation 5 above (e.g., steady-state condition):

$$(\kappa_{12}-\beta)[(\kappa_{12}+\kappa_{23})-\beta](\kappa_{23}-\beta) - \gamma_{23}^2(\kappa_{12}-\beta) = 0 \quad (6)$$

Next, letting $x = (\kappa_{12}+\kappa_{23}) - \beta$, equation 6 above can be written as:

$$x(x-\kappa_{12})(x-\kappa_{23}) - \gamma_{23}^2(x-\kappa_{23}) = 0 \quad (7)$$

Upon simplification, equation 7 above becomes:

$$(x-\kappa_{23})[x^2 - \kappa_{12}x - \gamma_{23}^2] = 0 \quad (8)$$

The three roots of equation 8 are:

$$x = \kappa_{23} \Rightarrow \beta_1 = \kappa_{12} \quad (9)$$

$$x = \frac{1}{2}[\kappa_{12} +/- (\kappa_{12}^2 + 4\gamma_{23}^2)^{1/2}] \Rightarrow \beta_{2,3} = (\kappa_{23}+\frac{1}{2}\kappa_{12}) +/- \frac{1}{2}(\kappa_{12}^2 + 4\gamma_{23}^2)^{1/2} \quad (10)$$

Since typically $\gamma \ll \kappa$, $(\kappa_{12}^2 + 4\gamma_{23}^2)^{1/2} \cong \kappa_{12}(1 + 2\gamma_{23}^2/\kappa_{12}^2)$. Thus, equation 10 becomes:

$$\beta_{2,3} = (\kappa_{23}+\frac{1}{2}\kappa_{12}) +/- \frac{1}{2}(\kappa_{12} + (2\gamma_{23}^2/\kappa_{12})) \quad (11)$$

From equations (9) and (11) above, as a result, $$|\beta_1-\beta_2|=(\kappa_{23}-\tfrac{1}{2}\kappa_{12})+\tfrac{1}{2}(\kappa_{12}+(2\gamma_{23}^2/\kappa_{12}))=\kappa_{23}+(\gamma_{23}^2/\kappa_{12}) \quad (12)$$

$$|\beta_1-\beta_3|=\kappa_{23}-(\kappa_{12}+(\gamma_{23}^2/\kappa_{12})) \quad (13)$$

$$|\beta_2-\beta_3|=\kappa_{12}-2\gamma_{23}^2/\kappa_{12} \quad (14)$$

The shortest beating length is thus found to be determined by $|\beta_2-\beta_3|$, that is, the interaction between the first tap waveguide and the second tap waveguide. As a result, in this example, it is determined that $$|\beta_2-\beta_3|>|\beta_1-\beta_2|>|\beta_1-\beta_3|.$$

In order that the coupling loss is minimized, therefore, the length $L_1$ of the tap is proportional to:

$$(\kappa_{12}-2\gamma_{23}^2/\kappa_{12})^{-1} \quad (15)$$

and approximately:

$$(1/\kappa_{12})(1-2\gamma_{23}^2/\kappa_{12}^2) \quad (16)$$

Turning to FIG. 3, a cross sectional view taken along the line 202–202 of the optical tap OIC of FIG. 2 is illustrated. The source waveguide 210, the first tap waveguide 220 and the second tap waveguide 240 are disposed at positions to facilitate optical coupling upon the silicon substrate 204 having an oxide layer 206 and surrounded by a cladding layer 208.

Figure 4:
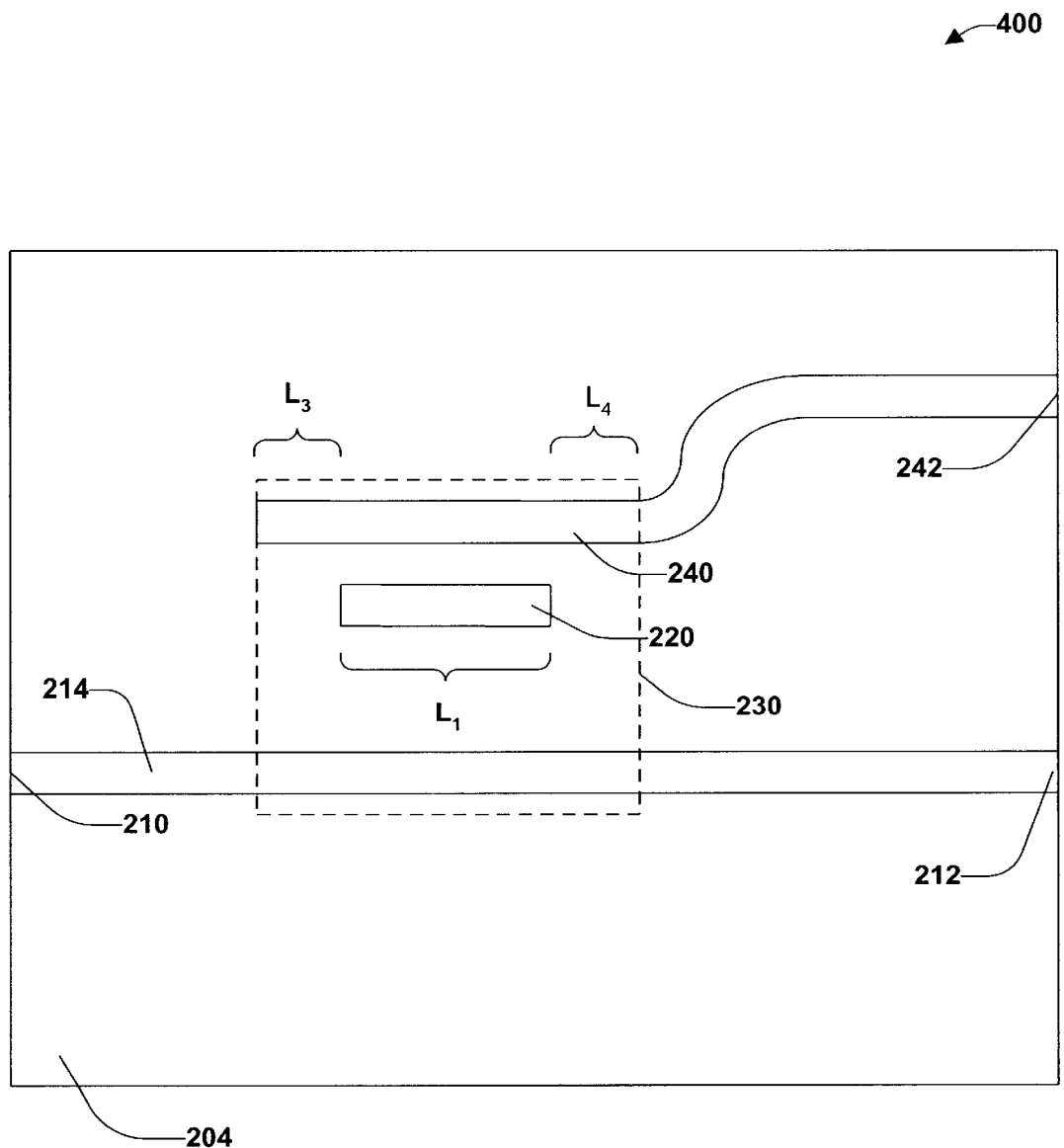
FIG. 4 is a schematic top plan view of another exemplary optical tap OIC having two tap waveguides in accordance with an aspect of the present invention.

Turning to FIG. 4, the second tap waveguide 240 can optionally have an additional length $L_3$ preceding the length $L_1$ and optionally an additional length $L_4$ following $L_1$. One or both of additional lengths $L_3$ and $L_4$ can, in some instances, serve to minimize power loss. The transfer of the input signal to the second tap waveguide 240 can be minimally dependent on polarization of the input signal. Further, the source waveguide 214, the first tap waveguide 220 and the second tap waveguide 240 can be of the same or differing widths. The first tap waveguide 220 and the second tap waveguide 240 are substantially parallel to the source waveguide in the coupling region 230.

In one embodiment, the length $L_1$ is about 1 micron or more and about 20000 microns or less. In another embodiment, the length of the portion of the second tap waveguide 240 in the coupling region (the sum of $L_1$, $L_3$ and $L_4$) is about 1 micron or more and about 30000 microns or less.

Figure 5:
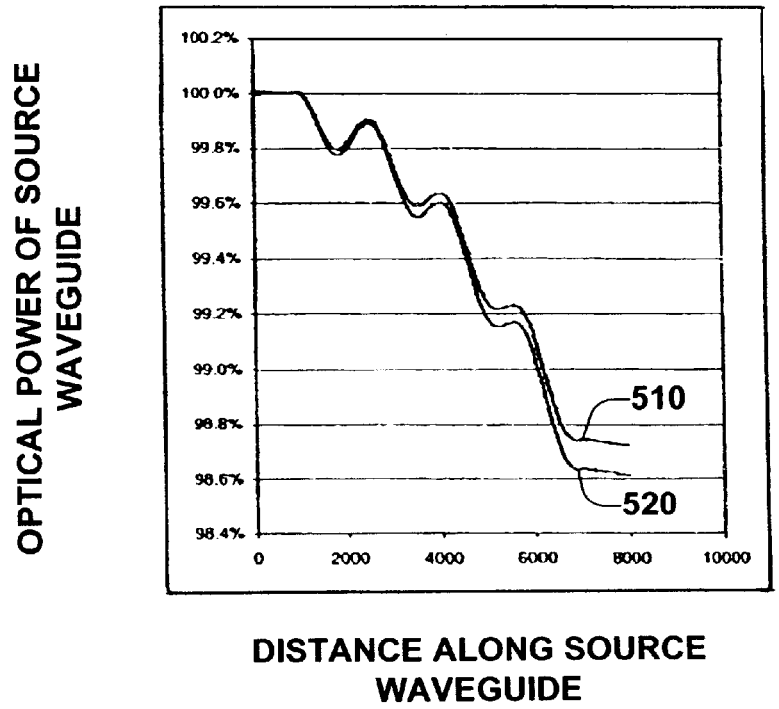
FIG. 5 is a graph illustrating variation of optical power along the source waveguide.
Figure 6:
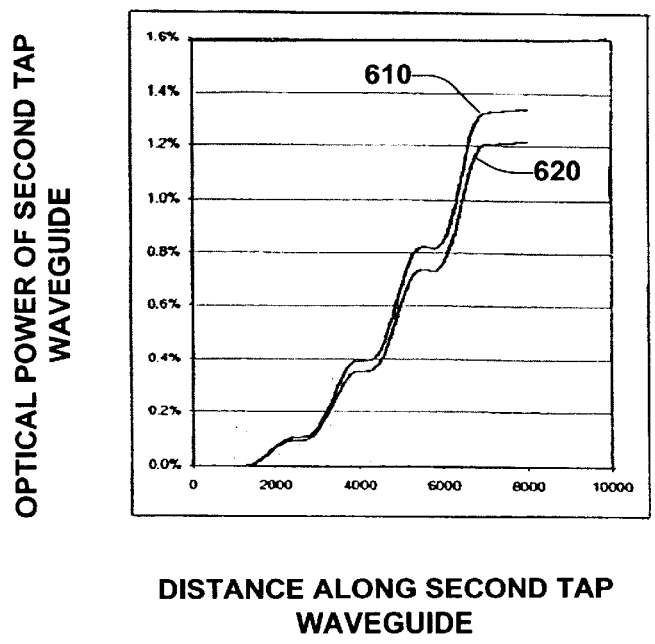
FIG. 6 is a graph illustrating variation of optical power along the second tap waveguide.
Figure 7:
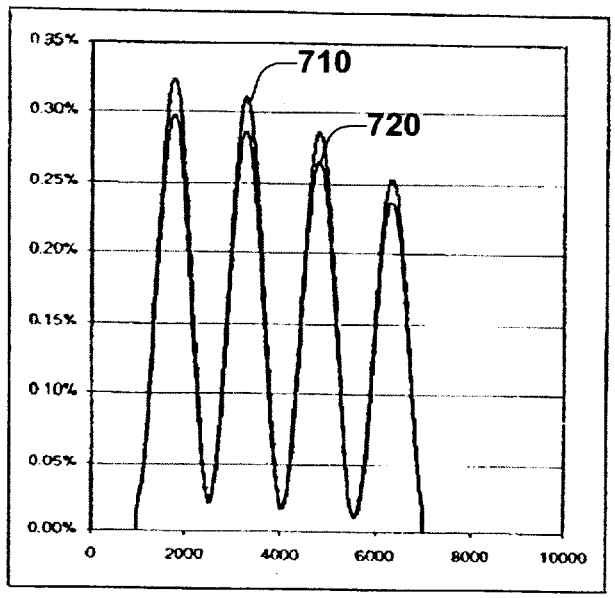
FIG. 7 is a graph illustrating optical power variation along the first tap waveguide.

Next, FIGS. 5, 6 and 7 graphically illustrate examples of optical power variations along a source waveguide 214 and a second tap waveguide 240 having a width of 7 microns, a first tap waveguide 220 having a width of 5 microns, a tap length $L_1$ of 6000 microns, a second tap waveguide 240 additional lengths $L_3$ and $L_4$ of 1000 microns, a first distance of 3 microns, a second distance of 7 microns, waveguide thickness of 6 microns, core index of 1.455 and clad index 1.445.

FIG. 5 illustrates optical power variations along waveguide 240. Curve 510 is associated with the transverse electric (TE) wave propagation and curve 520 is associated with the transverse magnetic TM wave propagation.

Turning to FIG. 6, optical power variation of the second tap waveguide 240 is illustrated. Curve 610 is associated with the TE wave propagation and curve 620 is associated with the TM wave propagation. Referring to FIGS. 5 and 6, the sum of optical power on the second tap waveguide 240 and the source waveguide 214 at the end of the coupling region 230 is very close to one hundred percent.

Next, FIG. 7 illustrates optical power variation of the first tap waveguide 220. Curve 710 is associated with the TE wave propagation and curve 720 is associated with the TM wave propagation. The power variation is oscillatory in nature and reaches a minimum at the termination of the first tap waveguide 220. In this example, power loss due to abrupt termination is estimated to be approximately 0.02%. By suitably modifying the device parameters adiabatic power transfer at different levels (1.3% in this example) can be achieved according to the present invention.

Another aspect of the invention provides methodologies for manufacturing an optical integrated circuit, wherein a base is provided having a source waveguide extending axially between first and second ends. A first tap waveguide is formed a first distance from the source waveguide for a coupling distance $L_1$. A second tap waveguide is formed a second distance from the first tap waveguide for at least the coupling distance $L_1$ thereafter tapering away from the source waveguide to an end of the base.

Although the invention has been shown and described with respect to certain illustrated implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", with, "has", "having", and variants thereof are used in either the detailed description or the claims, these terms are intended to be inclusive in a manner similar to the term "comprising.

What is claimed is:

1. An adiabatic optical tap, comprising:

a source waveguide for carrying an input signal;

a first tap waveguide positioned a first distance from the source waveguide in a coupling region; and, a second tap waveguide, a portion positioned a second distance from the first tap waveguide in the coupling region, the first distance is either greater than the second distance in the coupling region or the first distance is less than the second distance in the coupling region;

wherein the first tap waveguide is optically coupled to the source waveguide in the coupling region, the second tap waveguide is optically coupled to the first tap waveguide, the portion of the second tap waveguide in the coupling region having a length of about 1 micron or more and about 30000 microns or less, the second tap waveguide forming an output signal based at least in part upon the input signal, the first distance, the second distance, and the length of the second tap waveguide in the coupling region are selected so that power loss is about 0.5% or less.

2. The adiabatic optical tap of claim 1 wherein the first tap waveguide has a length less than a length of the portion of the second tap waveguide in the coupling region.

3. The adiabatic optical tap of claim 1 wherein the first tap waveguide has a length of about 1 micron or more and about 20000 microns or less.

4. The adiabatic optical tap of claim 1 wherein the source waveguide, the first tap waveguide and the second tap waveguide each have substantially the same width, the first distance, the second distance, the length of the second tap waveguide in the coupling region, and the waveguide widths are selected so that power loss is about 0.1% or less.

5. The adiabatic optical tap of claim 1 wherein the source waveguide and the second tap waveguide each have substantially the same width and the first tap waveguide has a width less than the source waveguide, the first distance, the second distance, the length of the second tap waveguide in the coupling region, and the waveguide widths are selected so that power loss is about 0.1% or less.

6. The adiabatic optical tap of claim 1 wherein the first distance is substantially the same as the second distance in the coupling region.

7. The adiabatic optical tap of claim 1 wherein the first distance is about 0.25 microns or more and about 20 microns or less.

8. The adiabatic optical tap of claim 1 wherein the first distance is about 1 microns or more and about 15 microns or less.

9. The adiabatic optical tap of claim 1 wherein the first distance is about 2 microns or more and about 10 microns or less.

10. The adiabatic optical tap of claim 1 wherein the second distance is about 0.25 microns or more and about 20 microns or less.

11. The adiabatic optical tap of claim 1 wherein the second distance is about 1 micron or more and about 15 microns or less.

12. The adiabatic optical tap of claim 1 wherein the second distance is about 2 microns or more and about 10 microns or less.

13. The adiabatic optical tap of claim 1 wherein at least one of the source waveguide, the first tap waveguide and the second tap waveguide further comprise at least one of doped silica, lithium niobate, undoped silica, glass, thermo optic polymers, electro optic polymers and indium phosphide.

14. The adiabatic optical tap of claim 1 wherein the first tap waveguide and the second tap waveguide are substantially parallel to the source waveguide in the coupling region.

15. An adiabatic optical tap, comprising:
    first tap means for optically tapping power from a source waveguide carrying an input signal, the first tap means positioned a first distance from the source waveguide wherein the first distance is about 0.25 microns or more and about 20 microns or less, the first tap means optically coupled to the source waveguide in a coupling region;
    second tap means for optically tapping power from the source waveguide, a portion of the second tap means positioned a second distance from the first tap means, the second tap means optically coupled to the first tap means in the coupling region, the portion of the second tap means in the coupling region having a length of about 1 micron or more and about 30000 microns or less, the second tap means forming an output signal based at least in part upon the input signal,
    the first distance, the second distance, and the length of the second tap means in the coupling region are selected so that power loss is about 0.5% or less.

16. The adiabatic optical tap of claim 15 wherein the first tap means has a length less than a length of the portion of the second tap means in the coupling region, the first distance, the second distance, the length of the second tap means in the coupling region, and the length of the first tap means are selected so that power loss is about 0.1% or less.

17. The adiabatic optical tap of claim 15 wherein the first tap means has a length of about 1 micron or more and about 20000 microns or less.

18. The adiabatic optical tap of claim 15 wherein the first distance is greater than the second distance in the coupling region.

19. The adiabatic optical tap of claim 15 wherein the second distance is about 0.25 microns or more and about 20 microns or less.

20. The adiabatic optical tap of claim 15 wherein the first tap means and the second tap means are substantially parallel to the source waveguide in the coupling region.

21. The adiabatic optical tap of claim 15 wherein at least one of the source waveguide, the first tap means and the second tap means further comprise at least one of doped silica, lithium niobate, undoped silica, glass, thermo optic polymers, electro optic polymers and indium phosphide.

22. A method of making an adiabatic optical tap, comprising:
    providing a base having a source waveguide extending axially between first and second ends;
    forming a first tap waveguide a first distance from the source waveguide for a coupling distance in a coupling region, wherein the first tap waveguide has a length of about 1 micron or more and about 20000 microns or less; and,
    forming a second tap waveguide a second distance from the first tap waveguide for at least the coupling distance in the coupling region, the first distance is either greater than the second distance in the coupling region or the first distance is less than the second distance in the coupling region, the portion of the second tap waveguide in the coupling region having a length of about 1 micron or more and about 30000 microns or less, the second tap waveguide thereafter tapering away from the source waveguide to the second end,
    the first distance, the second distance, and the length of the first tap waveguide are selected so that power loss is about 0.5% or less.

23. An adiabatic optical tap, comprising:
    a source waveguide for carrying an input signal;
    a first tap waveguide positioned a first distance from the source waveguide in a coupling region, wherein the first tap waveguide has a length of about 1 micron or more and about 20000 microns or less; and,
    a second tap waveguide, a portion positioned a second distance from the first tap waveguide in the coupling region;
    wherein the first tap waveguide is optically coupled to the source waveguide in the coupling region, the second tap waveguide is optically coupled to the first tap waveguide, wherein the first distance is greater than the second distance in the coupling region, the second tap waveguide forming an output signal based at least in part upon the input signal,
    the first distance, the second distance, and the length of the first tap waveguide are selected so that power loss is about 0.5% or less.

24. An adiabatic optical tap, comprising:

a source waveguide for carrying an input signal;

a first tap waveguide positioned a first distance from the source waveguide in a coupling region, wherein the first tap waveguide has a length of about 1 micron or more and about 20000 microns or less; and, a second tap waveguide, a portion positioned a second distance from the first tap waveguide in the coupling region;

wherein the first tap waveguide is optically coupled to the source waveguide in the coupling region, the second tap waveguide is optically coupled to the first tap waveguide, wherein the first distance is less than the second distance in the coupling, the second tap waveguide forming an output signal based at least in part upon the input signal, the first distance, the second distance, and the length of the first tap waveguide are selected so that power loss is about 0.5% or less.

* * * * *